United States Patent
Quade

(10) Patent No.: US 8,521,144 B2
(45) Date of Patent: Aug. 27, 2013

(54) LOCATION-BASED TELEPHONE CONFERENCES WHERE A CONFERENCE IS ASSOCIATED WITH A COVERAGE AREA

(75) Inventor: Michael Quade, Meckenheim (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 13/381,160

(22) PCT Filed: Sep. 3, 2010

(86) PCT No.: PCT/EP2010/005406
§ 371 (c)(1),
(2), (4) Date: Feb. 6, 2012

(87) PCT Pub. No.: WO2011/026628
PCT Pub. Date: Mar. 10, 2011

(65) Prior Publication Data
US 2012/0149349 A1    Jun. 14, 2012

(30) Foreign Application Priority Data
Sep. 3, 2009    (DE) .......................... 10 2009 039 834

(51) Int. Cl.
*H04M 3/42*    (2006.01)
(52) U.S. Cl.
USPC ....... 455/416; 455/518; 455/519; 379/205.01
(58) Field of Classification Search
USPC .................... 455/416, 519, 518; 379/205.01
See application file for complete search history.

(56) References Cited

U.S. PATENT DOCUMENTS

| 6,163,692 A * | 12/2000 | Chakrabarti et al. ......... 455/416 |
| 6,542,750 B2 | 4/2003 | Hendrey |
| 7,031,700 B1 | 4/2006 | Weaver |
| 7,415,099 B2 | 8/2008 | Qian |
| 7,436,785 B1 | 10/2008 | McMullen |
| 7,626,951 B2 | 12/2009 | Croy |
| 2002/0107008 A1 | 8/2002 | Hendrey |
| 2003/0063573 A1 * | 4/2003 | Vandermersch ............. 370/260 |
| 2006/0199612 A1 * | 9/2006 | Beyer et al. ................ 455/556.2 |
| 2009/0100181 A1 * | 4/2009 | Bengtsson .................... 709/229 |
| 2011/0249078 A1 * | 10/2011 | Abuan et al. ............... 348/14.02 |

FOREIGN PATENT DOCUMENTS

| DE | 3130408 A | 2/1983 |
| WO | 0131964 A | 5/2001 |
| WO | 2010022756 A | 3/2010 |

* cited by examiner

*Primary Examiner* — Danh Le
(74) *Attorney, Agent, or Firm* — Andrew Wilford

(57) ABSTRACT

The application relates to location based telephone conferences. In a location based telephone conference, upon request from a user to join a telephone conference, his location is determined and he is joined to a conference according his location. However, in the prior art it is assumed that the user remains in the telephone conference even if he moves and changes his location. The application addresses a situation where a plurality of telephone conferences, each associated with a specific area (1.4), are provided and a user moves between these areas. The telephone conferences are managed in such a way, that when a subscriber leaves an area assigned to a specific conference, he is switched into another telephone conference which is assigned to the area the user is presently located.

21 Claims, 1 Drawing Sheet

LOCATION-BASED TELEPHONE CONFERENCES WHERE A CONFERENCE IS ASSOCIATED WITH A COVERAGE AREA

CROSS REFERENCE TO RELATED APPLICATIONS

This application is the US-national stage of PCT Application PCT/EP2010/005406 filed 3 Sep. 2010, published 10 Mar. 2011 as WO2011/026628, and claiming the priority of German patent application 102009039834.1 itself filed 3 Sep. 2009.

FIELD OF THE INVENTION

The invention relates to a method for managing a telephone conference with two or more subscribers within a cellular mobile radio network, the telephone conference being assigned a definable coverage area within the cellular mobile radio network, wherein the reception of a subscriber into the telephone conference takes place if the subscriber is located within the coverage area at the moment of the connection establishment.

BACKGROUND OF THE INVENTION

A method of this kind for managing a location based telephone conference within a cellular mobile radio network is disclosed in U.S. Pat. No. 7,436,785. Furthermore, it is known to set up telephone conferences with one or more subscribers within a mobile radio network, wherein the individual subscribers have to specifically dial in via an adequate call number. However, these telephone conferences are not publicly accessible for everybody.

As internet applications, so-called chat systems are known in which access is allowed for everybody, this means that it is possible that a plurality of subscribers can enter a chat room via an internet application and it is thereby made possible that people can chat in a simple manner with third parties by exchanging text messages.

However, when using mobile radio networks, the preferred communication means is the voice. A method for location based telephone conferencing within a mobile radio network enables subscribers to communicate with other subscribers in the same general location, in particular in the same coverage area of the mobile radio network, like users in a chat room do. The coverage area in this case is assigned to a particular telephone conference and is geographically a part of the whole coverage area of the cellular mobile radio network. By assigning a coverage area to a particular telephone conference user groups, so called communities, can be specified and users can be grouped together as a community in a telephone conference which is open for a plurality of users.

However, if the subscriber of a telephone conference moves and/or the telephone conference itself moves geographically in that the subscriber leaves the coverage area, the subscriber's participation in the telephone conference and his temporary membership of the local user group ends.

OBJECT OF THE INVENTION

It is the object of the invention to develop a method for managing a telephone conference with two or more subscribers within a cellular mobile radio network in such a manner that a subscriber leaving the coverage area assigned to a telephone conference is able to continue chatting with subscribers of a community with similar interests.

SUMMARY OF THE INVENTION

This object is solved according to the invention by a method for managing a telephone conference with two or more subscribers within a cellular mobile radio network where the telephone conference is assigned a definable coverage area within the cellular mobile radio network, and where the reception of a subscriber into the telephone conference takes place if the subscriber is located within the coverage area at the moment of the connection establishment, and upon leaving the coverage area a switch into another telephone conference that is assigned to the local position of the subscriber within another coverage area takes place.

This means that the geographic position of the subscriber at the moment when he wants to join the telephone conference is considered, thus the location where the subscriber is located. If the subscriber moves away from the coverage area, or if the telephone conference, i.e. the coverage area moves away from the subscriber, or if the subscriber and the telephone conference move away from each other, so that the subscriber leaves the coverage area, it is proposed according to the invention that the subscriber joins another telephone conference which is assigned to his new local position or which movingly reaches and covers the static local position of the subscriber. Thus, the subscriber can continue chatting with subscribers of a telephone conference within a cellular mobile radio network.

Preferably, the reception of a subscriber in the telephone conference takes place only if the subscriber is located within the coverage area assigned to said telephone conference within the cellular mobile radio network.

The method according to the invention allows to provide a service which is similar to the old amateur radio in a modern mobile radio network. For this, a location reference of the subscriber is generated and the subscriber is automatically transferred into the telephone conference which is only accessible for subscribers who, at a respective starting time, are in the vicinity of said location. Hereby, a local reference, i.e. a location reference of telephone conference and subscriber is provided. If the subscriber and/or the telephone conference changes/change the geographic location a new local reference results and the subscriber joins another telephone conference.

In a preferred embodiment, the size of the coverage area is determined depending on the number of potential conference subscribers. This means in particular that the size of the coverage area is variable. The size of the coverage area can be determined in such a manner that in regions with a low number of subscribers, a larger radius is selected for the coverage area than in regions with many subscribers. It has to be noticed that the term radius does not indicate that the coverage area has a circular shape. Moreover the shape of the coverage area is determined by the amount, size and arrangement of the cells of the mobile radio network which more or less overlap each other.

The method is implemented in such a manner that an optimal distribution of the subscribers over the "chat rooms" to be expected takes place according to the different telephone conferences. Furthermore, the radii can vary with respect to time and depending on the weekday. The average number of subscribers per chat room, i.e. per coverage area, can be predetermined, and should not exceed a certain number, for example 10 subscribers per telephone conference.

Preferably, the coverage area is defined by one or more contiguous cells of a cellular mobile radio network. This approach allows a particularly simple definition of the respective coverage area in which a telephone conference is set up and managed and thus quasi forms a local chat room.

Preferably, the method is started on the subscriber's side by dialing a speed dial number by means of a mobile radio terminal which is registered in the mobile radio network.

Preferably, the local position of the subscriber is detected based on the location of the mobile radio cell in which the subscriber is registered in the mobile radio network and/or by means of satellite based location finding like GPS (Global Positioning System) used for navigation. A determination of the local position of the subscriber based on the location of the mobile radio cell in which the subscriber is registered in the mobile radio network can be implemented and performed on the network side in a very uncomplicated manner, for example by requesting information from the so called home location register (HLR) of the mobile radio network. A determination of the local position of the subscriber by means of satellite based location finding can be carried out by means of a satellite navigation module which is integrated the mobile radio terminal and which determines the position of the terminal by evaluating the signals of several navigation satellites.

The location reference can thus be implemented by different methods such as, for example, by the location of the mobile radio cell in which the subscriber is located, and/or by a determination of the location by means of satellite based location finding, for example by GPS. However, preferably, the method is implemented in such a manner that a manual selection of the location by the user side is disabled.

In a particular embodiment of the invention the subscribers of the telephone conference, i.e. the respective user group, is traveling along a route, in particular a motorway, and, consequently, the respective telephone conference is moving along this route as well. In this embodiment the currently used motorway or motorway section forms the coverage area and is utilized to define a "chat room". If a user travels on this motorway or within this motorway section, too, he can join this "chat room". If he leaves the motorway or motorway section and continue traveling on another motorway a switch into another telephone conference which is assigned to this other motorway takes place.

In a preferred embodiment, the maximum number of subscribers of a telephone conference can be specified. Hereby can be ensured that, for example, the average number of subscribers per chat room does not exceed a certain number, such as, for example, 10.

Preferably, upon exceeding a maximum number of subscribers, a further telephone conference is opened and/or further subscribers are rejected.

In the case that a higher number than a specified limit value is reached, the "chat room" can be divided into two new smaller chat rooms. This means that the subscribers of the current telephone conference are divided up and assigned to two smaller new telephone conferences. A smaller telephone conference in this case means a telephone conference with smaller number of subscribers than previously participated in the original telephone conference. The division of the telephone conferences can be carried out by decreasing the size of the coverage area, in particular its radius, and setting up a second covering area within the area previously occupied by the first coverage area.

Within the meaning of the invention, the term chat room is used as synonym for a telephone conference with two or more subscribers, wherein the telephone conference can stay open as a chat room for further subscribers, and a dial-in into an existing telephone conference or opening a new telephone conference for a subscriber registered in the mobile radio network is possible without the need of a prior registration of the subscriber to join a telephone conference, and without any configuration of a telephone conference.

However, preferably the method is implemented in such a manner that subscribers which are in a border region between a plurality of chat rooms can decide at the beginning of a telephone conference in which chat room they want to participate, i.e., to which coverage area they want to belong at the moment of the set up of the telephone conference or when joining an existing telephone conference. Chat room is thus to be understood as a certain telephone conference which is assigned to a local area where subscribers can communicate verbally via the telephone conference.

Preferably, the set up and management of the telephone conferences are carried out by means of one or more server(s) which is/are assigned to or is/are part of the mobile radio network.

In a particularly preferred embodiment, a voice-operated subscriber guidance on the network's side is carried out via a voice portal. A voice portal is to be understood as an interface with voice output and/or voice recognition means to allow a particularly convenient user guidance.

In a preferred embodiment, for transmission of the voice, voice over IP (VoIP) is used. Voice over IP (Vol P) stands for voice over internet protocol telephony or, in short, internet telephony.

Preferably, the switch into the other telephone conference is initiated automatically. This embodiment of the method according to the invention ensures an easy and convenient way for the subscriber to continue to chat with subscribers within a telephone conference without the necessity of any interaction. However, alternatively, it is also possible that the subscriber only switches to the other telephone conference if he confirms a respective request or if he has preconfigured settings for telephone conferencing in that manner that an automatic switch shall generally take place. This is explained below in detail. Hereby, the highest possible flexibility is ensured.

In a preferred embodiment, the switch into the other telephone conference is initiated only after the subscriber has left the coverage area for a definable time period. Alternatively or additionally, the switch into the other telephone conference takes place only after the subscriber has a definable relative distance to the coverage area. Both measures establish a kind of hysteresis and prevent a multiple switch between two telephone conferences the coverage areas of which adjoin each other, if the subscriber moves along a borderline between the coverage areas. The time period can be set to a few minutes, in particular 1 to 5 minutes. The distance can be set to a few meters up to a few kilometers depending on the size of the coverage area.

In particular, upon leaving the coverage area or entering the other coverage area a message can be sent to the subscriber, the message informing the subscriber about leaving or entering a coverage area. The message can be a text or a speech message.

In a preferred embodiment the message is additionally used to request the subscriber to manually indicate if the switch into the other telephone conference shall take place. A speech or key input can then be expected from the subscriber, i.e. after the message has been sent. The switch will then take place if an affirming input of the subscriber is received by the network.

In a further preferred embodiment, upon leaving the coverage area or entering the other coverage area a preconfiguration is checked or preconfigured settings are checked wherein the pre-configuration or settings indicating whether an automatic switch to the other telephone conference or a request for manually initiating the switch to the other telephone conference shall take place.

Furthermore, preferably after the subscriber was switched to the other telephone conference a command is expected within a definable time period to switch back to the previous telephone conference. This ensures that the subscriber can get back to the initial telephone conference if a switch to the other telephone conference has taken place and although the local position of the subscriber is within a coverage area assigned to the other telephone conference. The time period can be set to a few seconds or up to a few minutes.

Further, the invention relates to a cellular mobile radio network which is equipped to carry out the method according the invention as described above.

BRIEF DESCRIPTION OF THE DRAWING

An exemplary embodiment of the invention is illustrated by means of the enclosed figures. In the figures.

DETAILED DESCRIPTION

Figure 1:
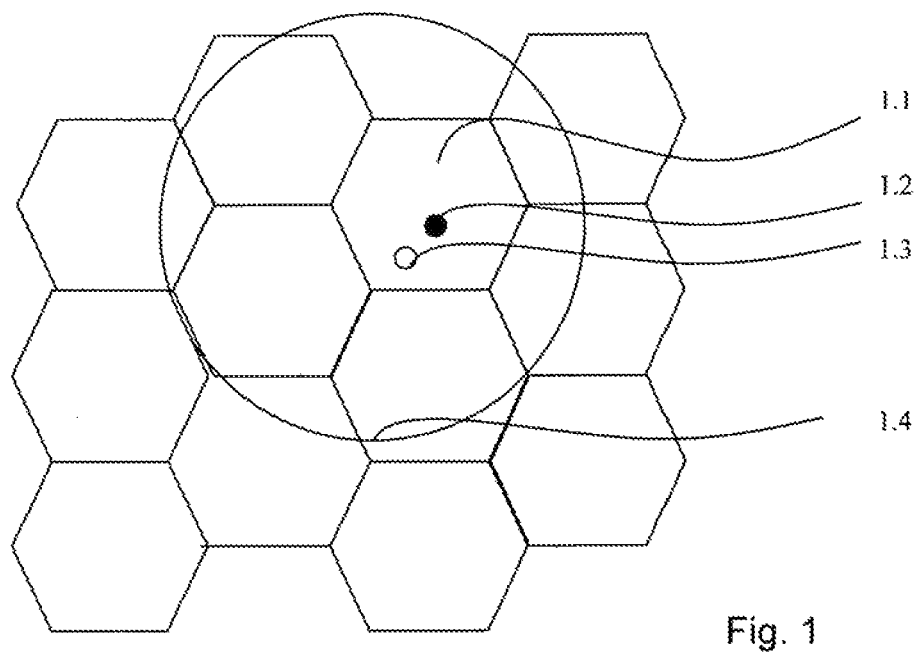
FIG. 1 shows a cellular mobile radio network with a defined coverage area.

In FIG. 1, a plurality of mobile radio cells 1.1 of a cellular mobile radio network is illustrated. The circle indicates a coverage area 1.4, i.e., a so-called chat room in a spatial sense which, in the illustrated case, comprises a plurality of contiguous mobile radio cells. A mobile radio subscriber 1.3 registered in the mobile radio cell 1.1 with his mobile radio terminal starts the telephone conference service by dialing a speed dial number. The subscriber 1.3 is automatically connected into a chat room, i.e. into an existing telephone conference with other subscribers 1.2 that are in the spatial vicinity of the subscriber, i.e. in the same coverage area. The connection to the telephone conference is carried out on the basis of the local position of the subscriber 1.3, the position being identified by means of the mobile radio cell 1.1, in which the mobile radio terminal is registered, and/or by means of geographic coordinates determined by means of satellite based location finding.

Within the coverage area 1.4 which, at the same time, forms the local/spatial chat room with location reference, a plurality of subscribers 1.2, 1.3 can now dial in and can communicate with one another as in a typical chat room known from Internet applications.

If the mobile radio subscriber 1.3 leaves his local position a little bit, in particular leaves the cell 1.1, he stays in the used telephone conference. Only if the subscriber 1.3 moves during the use in that he leaves the coverage area 1.4., i.e. the geographic borders of the chat room, he has the choice to continue to stay within the first chat room 1.4 or to switch into another chat room which corresponds to his new/actual location. An automatic transfer is also possible. This is in particular of interest during long car rides. The selection of staying in the first telephone conference or switching to the other telephone conference can be performed by means of a voice portal or through DTMF (dual-tone multi-frequency) operated by the mobile radio network on a server.

Figure 2:
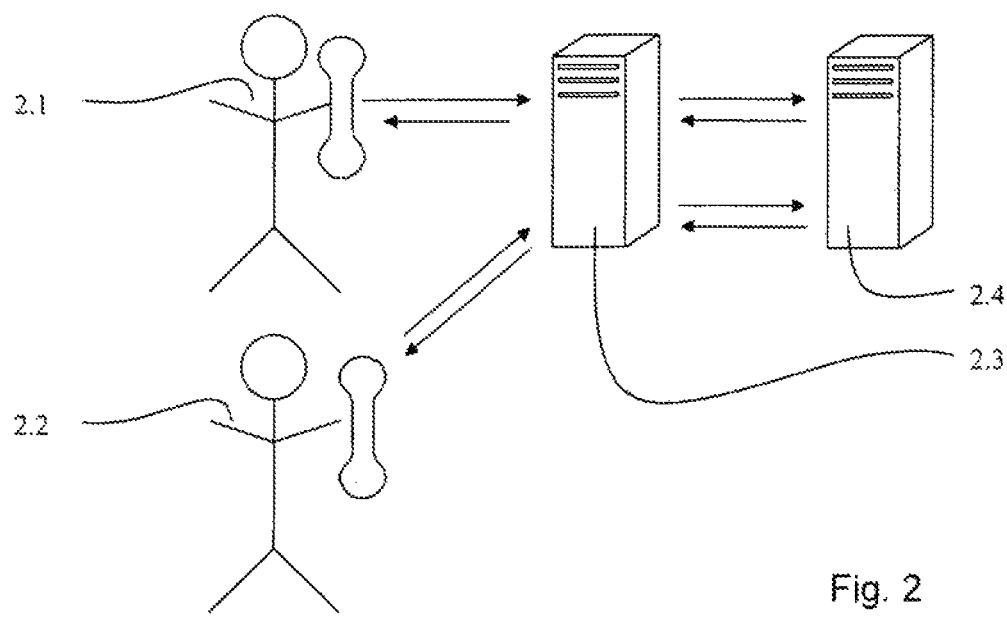
FIG. 2 shows the communication of two subscribers of a telephone conference via the mobile radio network.

In FIG. 2, the communication between two mobile radio subscribers 2.1 and 2.2 is illustrated. Within the mobile radio network, adequate servers 2.3 and 2.4 are provided for set up and management of the telephone conferences within the cellular mobile radio network. The servers 2.3, 2.4 provided on the network's side are networked with one another.

For joining a telephone conference, i.e. for joining a so-called chat room, the mobile radio subscriber 2.1 establishes the connection to the server 2.3 provided on the network's side. The server 2.3 identifies that a further mobile radio subscriber 2.2 is present in the region, i.e. in the coverage area corresponding to the chat room, so that via server 2.3, which is integrated in the mobile radio network, a telephone conference is set up between the two mobile radio subscribers 2.1 and 2.2. The subscribers 2.1 and 2.2 are now within the coverage area in the chat room assigned to the coverage area, i.e. within the telephone conference, and can communicate with each other.

The invention claimed is:

1. A method for managing a telephone conference with two or more subscribers within a cellular mobile radio network, the method comprising the steps of:
   assigning the telephone conference to a definable coverage area within the cellular mobile radio network,
   receiving a subscriber into the telephone conference if the subscriber is located within the coverage area at the moment of connection establishment,
   upon leaving the coverage area, switching the subscriber into another telephone conference assigned to the local position of the subscriber within another coverage area, and
   detecting the local position of the subscriber based on the location of the mobile radio cell in which the subscriber is registered in the mobile radio network or by satellite based location finding.

2. The method according to claim 1, wherein the reception of a subscriber in the telephone conference takes place only if the subscriber is located within the coverage area.

3. The method according to claim 1, wherein the size of the coverage area is determined depending on the number of potential conference subscribers.

4. The method according to claim 1, wherein the coverage area is defined through one or more cells of the cellular mobile radio network.

5. The method according to claim 1, wherein the method is started on subscriber's side by dialing a speed dial number by means of a mobile radio terminal registered in the mobile radio network.

6. The method according to claim 1, wherein a maximum number of subscribers of a telephone conference can be specified.

7. The method according to claim 1, wherein upon exceeding a maximum number of subscribers, further subscribers are rejected or another telephone conference is opened.

8. The method according to claim 1, wherein the set up and the administration of the telephone conferences is carried out on the network's side by means of a server assigned to the mobile radio network.

9. The method according to claim 1, wherein on the network's side, a voice-operated subscriber guidance is carried out via a voice portal.

10. The method according to claim 9, wherein the voice transmission is executed via voice over IP.

11. The method according to claim 1, wherein the switch into the other telephone conference is initiated automatically.

12. The method according to claim 1, wherein the switch into the other telephone conference is initiated only after the subscriber has left the coverage area for a definable time period.

13. The method according to claim 1, wherein the switch into the other telephone conference takes place only after the subscriber has a definable relative distance to the coverage area.

14. The method according to claim 1, wherein upon leaving the coverage area or entering the other coverage area a message is sent to the subscriber, the message informing the subscriber about leaving or entering a coverage area.

15. The method according to claim 14, wherein the message is a text or a speech message.

16. The method according to claim 14, wherein the subscriber is requested by the message to manually indicate if the switch into the other telephone conference shall take place.

17. The method according to claim 14, wherein a speech or key input is expected from the subscriber after the message has been sent, and that the switch takes place if an affirming input of the subscriber is received.

18. The method according to claim 1, wherein upon leaving the coverage area or entering the other coverage area a pre-configuration is checked, the pre-configuration indicating whether an automatic switch to the other telephone conference or a request for manually initiating the switch to the other telephone conference shall take place.

19. The method according to claim 1, wherein after the subscriber was switched to the other telephone conference a command is expected within a definable time period to switch back to the previous telephone conference.

20. A cellular mobile radio network for managing a telephone conference with two or more subscribers within a cellular mobile radio network, the network comprising:
   means for assigning the telephone conference to a definable coverage area within the cellular mobile radio network,
   means for receiving a subscriber into the telephone conference if the subscriber is located within the coverage area at the moment of connection establishment,
   means for, upon the subscriber leaving the coverage area, switching into another telephone conference assigned to the local position of the subscriber within another coverage area, and
   means for detecting the local position of the subscriber based on the location of the mobile radio cell in which the subscriber is registered in the mobile radio network or by satellite based location finding.

21. A method for managing a telephone conference with two or more subscribers within a cellular mobile radio network, the method comprising the steps of:
   assigning the telephone conference to a definable coverage area within the cellular mobile radio network,
   receiving a subscriber into the telephone conference if the subscriber is located within the coverage area at the moment of connection establishment, and,
   after the subscriber has left the coverage area, switching the subscriber for a definable time period into another telephone conference assigned to the local position of the subscriber within another coverage area.

* * * * *